July 6, 1965  J E. KOSTUR  3,192,800
ROTATABLE TURRET MOLDING MACHINE
Filed Sept. 8, 1961  5 Sheets-Sheet 1
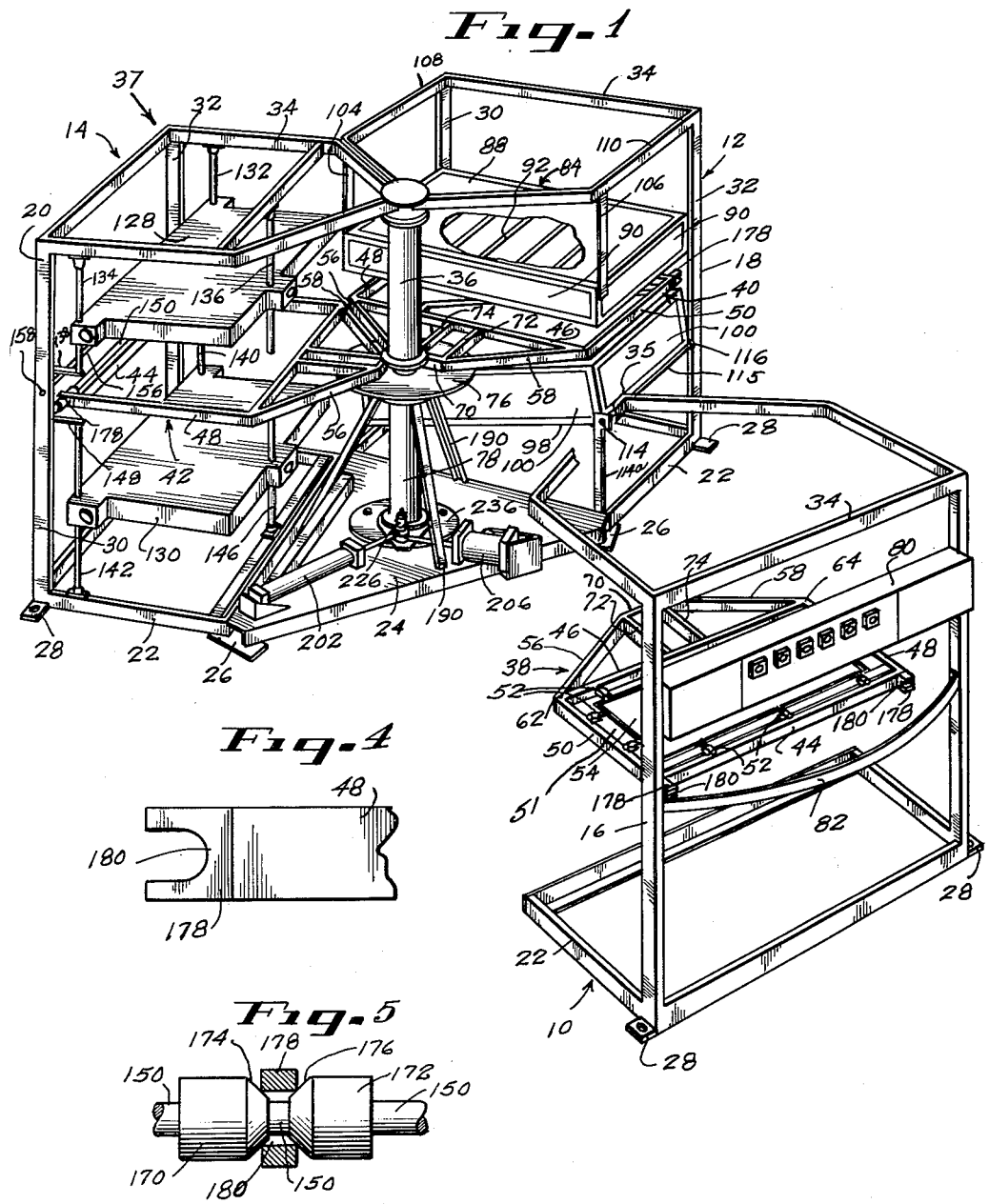
INVENTOR.
J. Edward Kostur
BY
Fidler, Beardsley & Bradley
ATTORNEYS

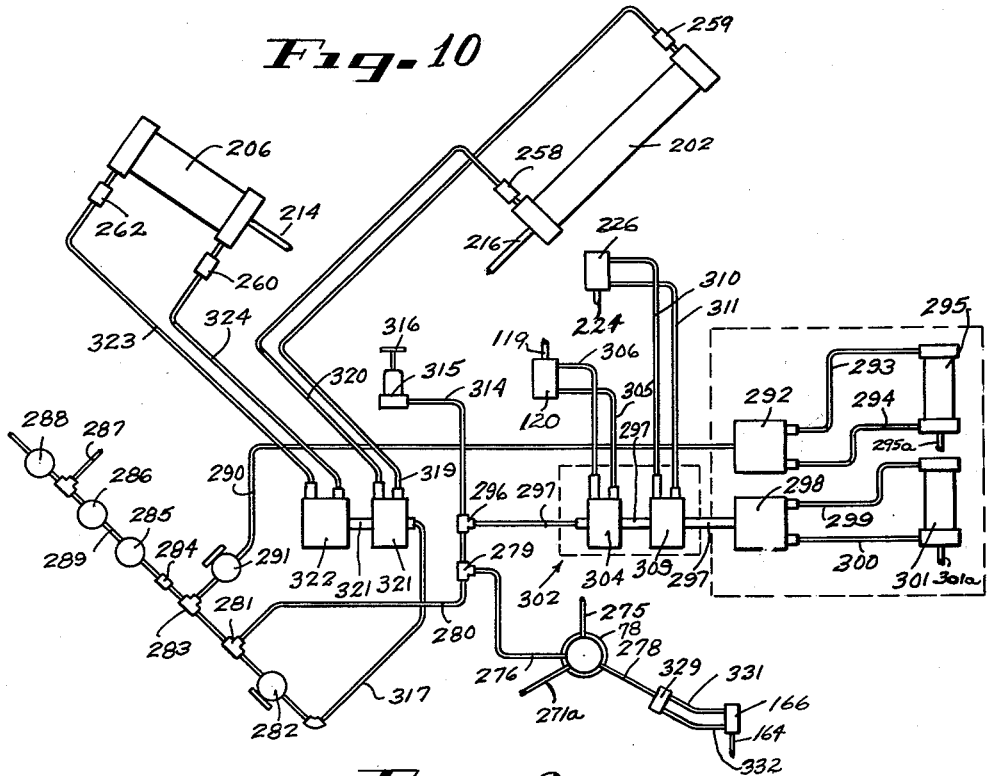
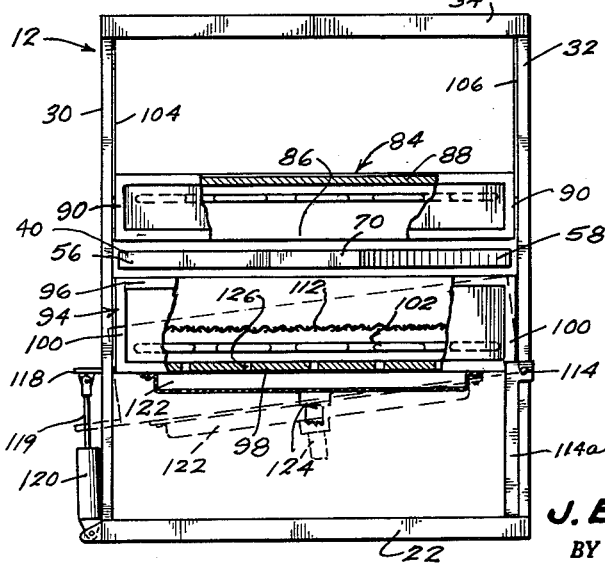

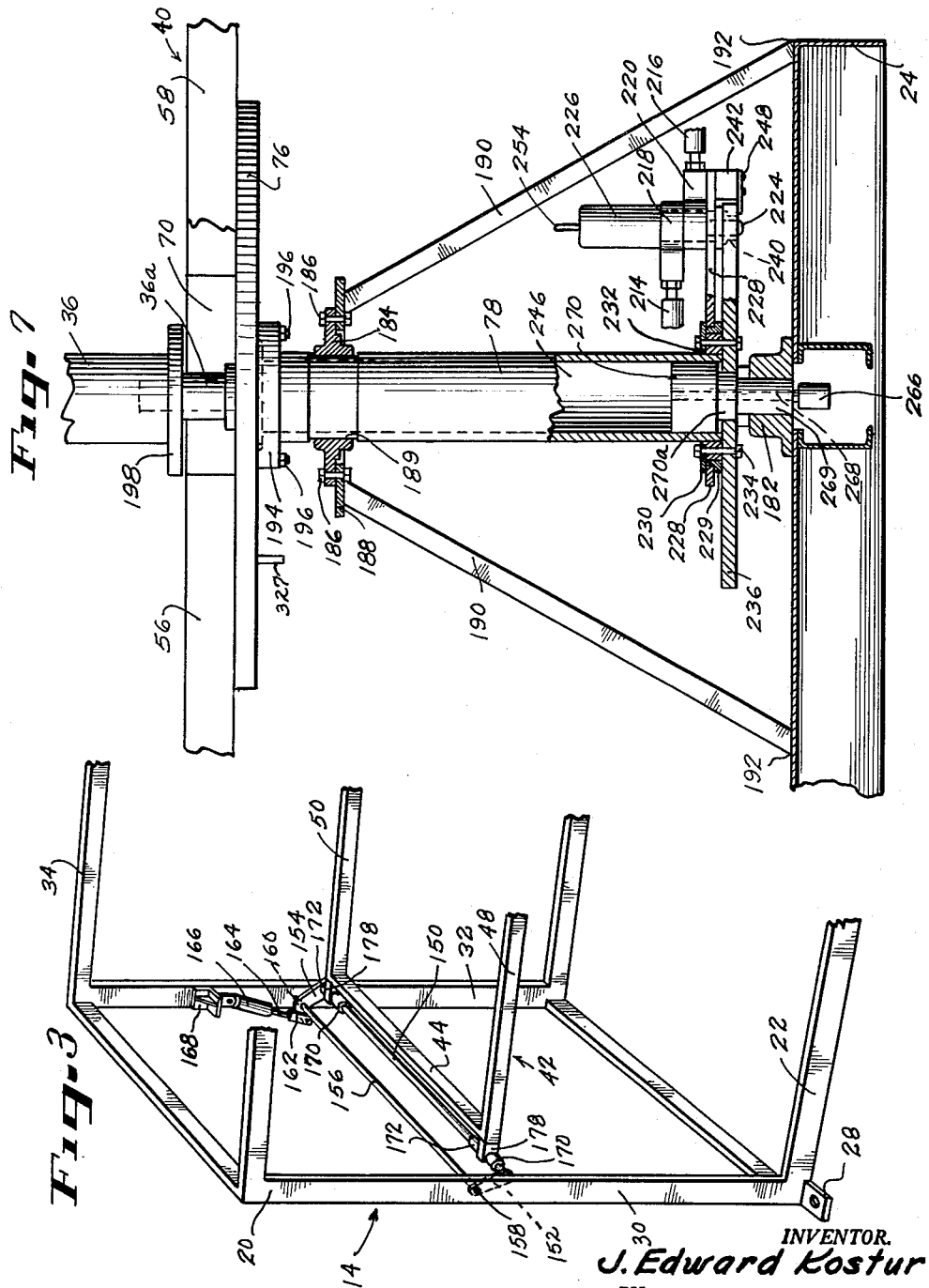

July 6, 1965  J E. KOSTUR  3,192,800
ROTATABLE TURRET MOLDING MACHINE
Filed Sept. 8, 1961  5 Sheets-Sheet 4

INVENTOR.
J. Edward Kostur
BY
Fidler, Beardsley & Bradley
ATTORNEYS

July 6, 1965                J E. KOSTUR                3,192,800
                   ROTATABLE TURRET MOLDING MACHINE
Filed Sept. 8, 1961                              5 Sheets-Sheet 5
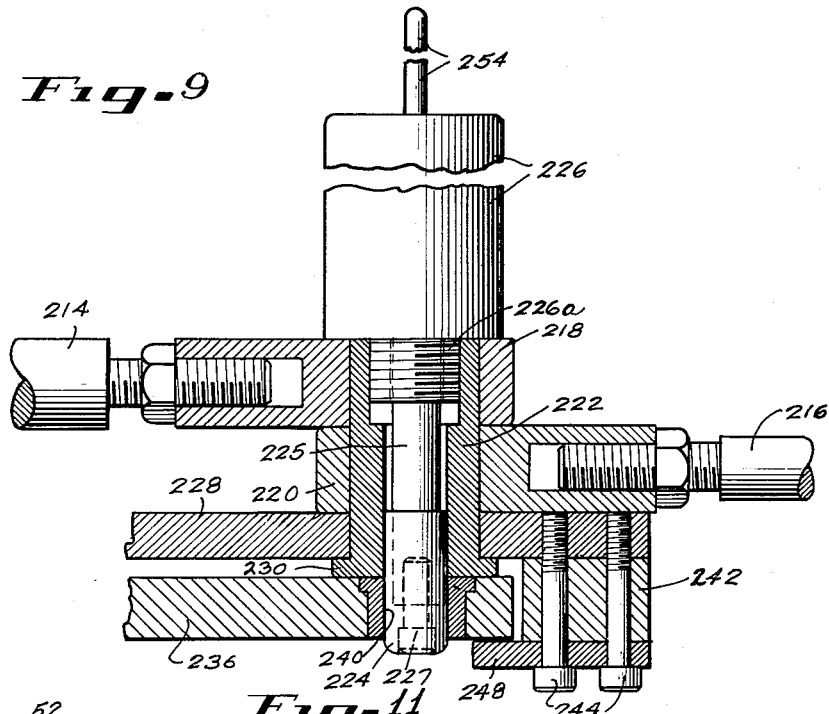
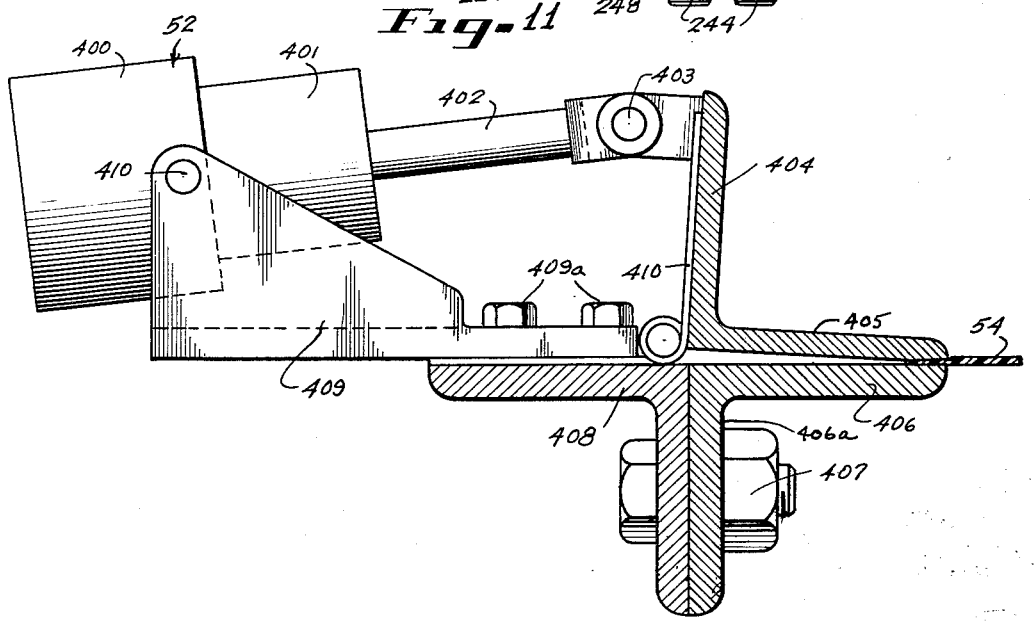
INVENTOR.
J. Edward Kostur
BY
Fidler, Beardsley & Bradley
ATTORNEYS United States Patent Office 3,192,800
Patented July 6, 1965

3,192,800
ROTATABLE TURRET MOLDING MACHINE
J Edward Kostur, Elmhurst, Ill.; Pioneer Trust & Savings Bank, executor of the estate of said Kostur, deceased, assignor to Comet Industries, Inc., Bensenville, Ill., a corporation of Illinois
Filed Sept. 8, 1961, Ser. No. 138,220
17 Claims. (Cl. 74—822)

This invention relates to molding of plastic and like materials and it is more particularly directed to new and improved means for forming articles from such materials.

Heretofore, difficulty has been encountered in the design of automatic molding systems and in plant layouts of such systems because of the space requirements thereof. For example, some prior art automatic molding systems required a loading station, heating station, molding station, and removal station, said stations usually being laid out in linear sequence. With such system layouts, considerable space was required therefor and at least two employees were required to maintain the system in operation.

In Rekettye U.S. Patent No. 2,862,232, there is disclosed apparatus for use in molding elastomeric material, which includes a table having a plurality of molds which are sequentially moved through a series of stations and which has a pneumatic drive mechanism for rotating the mold table through the various stations. The system and the drive mechanism therefor are overly complicated, have inherent operation limitations, and present maintenance problems not found in the system of the present invention.

With the present invention the problems and difficulties of the prior art are substantially overcome by the provision of semi-automatic molding apparatus employing a novel pneumatic drive and in which the various operating stations are positioned radially from a common center, in which the loading station is also the removal station, which can be operated by one person, and which can be operated at speeds in excess of those of the prior art.

It is, therefore, an object of the present invention to provide a new and improved machine for molding plastic and like materials.

Another object of the present invention is to provide new and improved apparatus for molding plastic materials wherein the stations of the apparatus are positioned circumferentially about a common center, in which the loading station is also the removal station, and which can be operated by one person.

Still another object of the present invention is to provide an automatic molding apparatus wherein the various stations of the apparatus are located circumferentially about a common center and wherein is provided new and improved drive means for automatically and sequentially moving a plurality of sheets of plastic material to be molded between the operating stations of the apparatus.

A further object of the present invention is to provide new and improved drive means for sequentially transferring a material to be formed between stations of a molding machine in which the operating stations are grouped in spaced circumferential relation about a common center.

A yet further object of the invention is to provide new and improved pneumatic drive means for driving a work table through three circumferentially arranged, equally spaced operating positions.

A still further object of the present invention is to provide for plastic molding apparatus a new and improved oven station including means for accommodating the possible sagging of the plastic material.

Another object of the present invention is to provide new and improved means for minimizing damage to, and shutdown of and operation of an oven station of molding apparatus.

Still another object of the present invention is to provide new and improved means for accurately aligning a clamp frame carrying a plastic material to be formed in molding apparatus.

Another object of the present invention is to provide new and improved accumulator means for supplying the hydraulic or pneumatic fluid which actuates the molding apparatus.

Still another object of the present invention is to provide new and improved clamping means adapted to hold firmly suspended therebetween a sheet of material to be molded.

Another object of the present invention is to provide a new and improved clamp for holding sheet material therebetween and which applies a constant pressure to the material regardless of the cross-sectional thickness of the sheet or change in said thickness.

These and other objects, features and advantages of the present invention will become readily apparent from a careful consideration of the following detailed description when considered in conjunction with the accompanying drawings illustrating a preferred embodiment of the present invention and wherein:

FIG. 1 is a partially exploded, perspective view of a molding apparatus constructed in accordance with the principles of the present invention, the loading station being exploded from the other stations to facilitate illustration;

FIG. 2 is an elevational view, in partial section, illustrating the new and improved oven station of FIG. 1;

FIG. 3 is an enlarged, fragmentary view, in elevation, illustrating the frame aligning means of the molding station of the apparatus of FIG. 1;

FIG. 4 is an enlarged, fragmentary view, in side elevation, of the rotatable frame of the apparatus of FIG. 1 illustrating one of the two grooved frame extensions employed for accurately aligning the frame at the molding station;

FIG. 5 is an enlarged, fragmentary view illustrating the cooperative relationship between the grooved frame extensions and the stabilizer bar portion of the aligning means of the molding station of the apparatus of FIG. 1;

FIG. 7 is an enlarged view, in partial section, illustrating the new and improved air accumulator and main drive shaft of the machine of FIG. 1;

FIG. 9 is an enlarged fragmentary view, in elevation, of the actuator of the drive means of FIG. 1;

FIG. 10 is a diagrammatic view of the pneumatic control system of the apparatus of FIG. 1; and FIG. 11 is an enlarged view, in partial section, of a clamping device constructed in accordance with the present invention.

Figure 6:
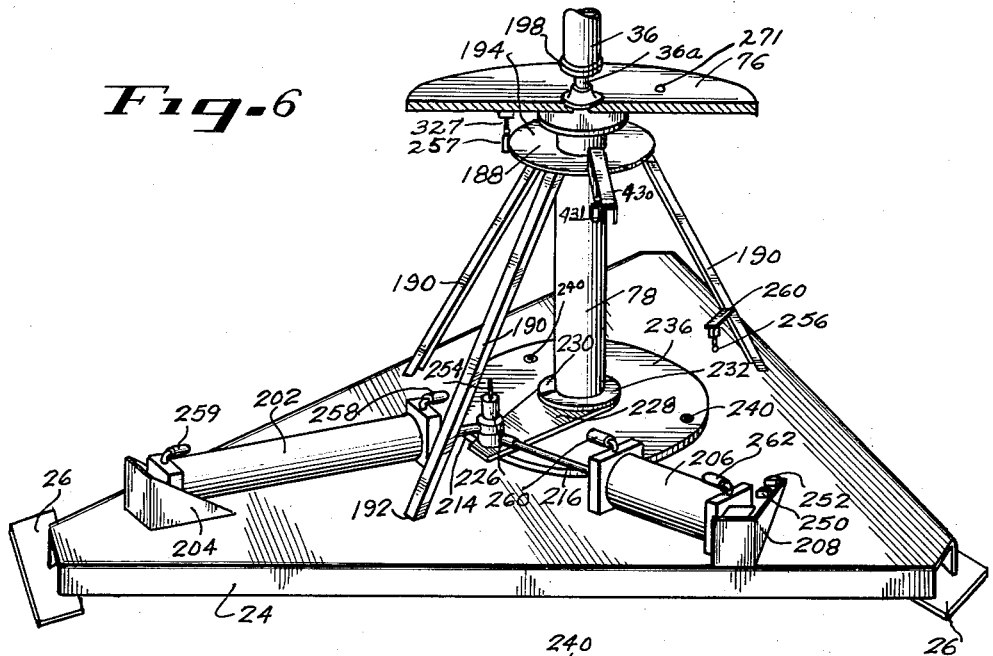
FIG. 6 is a perspective view, in partial section, illustrating the new and improved drive means of the machine of FIG. 1.

Referring to FIG. 1, there is disclosed a molding machine constructed in accordance with the present invention. It is of the box type and is designed for molding formed articles from sheets of plastic and elastomeric materials. As shown, it comprises three operating stations, a loading and unloading station 10, a heating or oven station 12, and a molding station 14. Each of the stations 10, 12 and 14 includes a stationary frame section, the loading and unloading station 10 having a loading frame section 16, the oven station 12 having a similar frame section 18, and the molding station 14 having a similar frame section 20. Each of the stationary frame sections 16, 18 and 20 includes a stationary rectangular base 22 having a portion thereof welded or otherwise secured to a triangular floor support 24 which is mounted to the floor of the room in which the system is employed by corner plates, such as plate 26. A plurality of floor mounting plates 28 cooperate with the plates 26 to fixedly secure the frame sections 16, 18 and 20 and the base 24 to the floor of the room in which the system is employed.

Referring to the loading and unloading station of FIG. 1, each of the frame sections 16, 18 and 20 includes a pair of uprights 30 and 32 which are mounted on or formed integrally with the base 22. The uprights 30 and 32 carry an upper hexagonal support 34 which is welded or otherwise secured thereto. Each of the hexagonal supports 34 is welded or otherwise secured at its apex 35 to a vertical support and center post 36. In this manner, each of the stations 10, 12 and 14 is maintained in radial fixed position with respect to the post 36 thereby to provide a space-saving feature of the present invention. Moreover, the operating stations 10, 12 and 14 are circumferentially spaced at 120 degree intervals about the central vertical axis of the machine.

In the practice of the present invention, and as more fully described hereinafter, a sheet of plastic or elastomeric material is placed, by the operator, on the rotary carriage of the machine at the loading and unloading station 10, rotated from the station 10 to the oven station 12 where it is momentarily stopped and heated to a condition of plasticity sufficient to facilitate its forming to a desired shape in the molding station 14. From the oven station 12, the now heated sheet is rotated to the molding station 14, whereat it is again momentarily stopped and formed into the desired shape by conventional die means. The now formed article is rotated to the loading and unloading station 10 wherein it is again halted. It may now be removed from the machine by the operator. After removal of the formed article at the station 10, the operator places another sheet of plastic material on the unloaded frame and the cycle is repeated.

It will be understood that each of the stations 10, 12 and 14 are normally in operation simultaneously and, thus, three sheets of plastic material are sequentially cycled through the system in the above described manner.

In order to carry the plastic sheets from station to station and for holding the sheets at the various stations, there is provided a carriage 37 having three sheet carrying rectangular frames 38, 40 and 42, which are each hexagonal in shape and respectively comprise a rear bar 44 and a front bar 46, disposed in mutually parallel relationship and which are interconnected by a pair of opposed parallel side bars 48 and 50. A clamp frame including a plurality of spaced clamps 52 is mounted on each of the frames 38, 40 and 42, but for purposes of illustration only the clamp frame which is mounted on the frame 38 is shown. The clamp frame 51 rigidly carries a sheet of plastic material 54 from which a molded article is to be formed. The details of construction and operation of the clamps 52 are described in detail hereinafter.

Each frame 38, 40 and 42 includes a centrally directed trapezoidal frame section incuding a pair of arms 56 and 58 connected respectively at each end to the outer edge of the front bar 46 of the frame. The arms 56 and 58 are inclined inwardly from the edges 62 and 64 of the front bar and are connected to a mounting bar 70 which extends substantially parallel to the front bar 46. There is also provided a pair of spaced strengthening bars 72 and 74 extending perpendicular to, and between, the front bar 46 and mounting bar 70.

The mounting bar 70 of each frame is welded or otherwise secured to a rotatable dial plate 76 carried for rotation by a vertical drive shaft 78 which, as illustrated in FIG. 1, is coaxially mounted with and beneath the post 36. As the shaft 78 and dial plate 76 are rotated, the frames move counterclockwise, as viewed from above the machine, from the loading and unloading station 10 to the oven station 12, to the molding station 14, and back to the loading and unloading station 10.

*Loading and unloading station*

The details of construction and operation of the loading and unloading staion are now to be described.

The uprights 30 and 32 of the loading and unloading station frame section 16 carries a master control unit 80 for initiating, stopping and otherwise controlling the operation of the machine. An outwardly bowed guard rail 82, supported between the uprights 30 and 32, prevents the operator's clothing from catching on the moving frames and for safety purposes, the control unit 80 is preferably of the type requiring the operator to simultaneously actuate two spaced-apart switches, one with each hand, in order to initiate each 120 degree cycle of rotation of the machine, thus minimizing the possibility of the operator having his hands under the clamp frame or unit within the path of movement of the rotatable frames when the machine is in operation.

*The oven station*

Referring to FIGS. 1 and 2, the oven assembly, constructed in accordance with the present invention, is supported on the stationary frame section 18. It is of two-piece construction, and includes an upper heating section 84 and a lower heating section 94. The upper heating section 84 is stationary and being mounted on a pair of depending brackets 104 and 106, carried by side bars 108 and 110 (FIG. 1), and includes an open bottom 86, a closed top wall 88, and closed side walls 90. Adjacent the top wall 88 is mounted a suitable heating coil 92, preferably of the sheathed type. The heat radiated from the coil 92 is directed down onto the upper surface or face of the plastic sheet material 54 carried by the frame 40 directly beneath the open bottom 86.

The bottom oven section 94 has an open top 96, a closed bottom wall 98, and closed side walls 100. A heating coil 102 also of any suitable type is supported in the lower oven section adjacent the bottom wall 98. Heat generated by the coil 102 radiates upwardly onto the lower surface of the plastic sheet 54 carried by the frame 40.

It will be observed that both the upper oven section 84 and the lower oven section 94 are supported from the frame section 12 in spaced relation so that a minimum distance is provided between the bottom 86, of the upper heating section and the open top 96 of the lower heating section. The frames 38, 40 and 42 may thus pass between the two sections but the loss of heat is held to a minimum. With this oven, both sides or surfaces of the plastic sheet suspended from the frame between the oven sections 84 and 94 are heated to substantially the same temperature to thereby assure uniform heating of the plastic sheet in preparation thereof for the molding or forming operation.

The plastic sheet material, even though rigidly suspended on a clamp frame 51 carried respectively by the frames 38, 40 and 42 has, when heated at the oven station, a tendency to sag or bow downwardly in the center thereof. Also should a plastic sheet 54 remain too long in the oven, it may fall into the lower oven section 94. Control means, more fully described hereinafter, is provided in this machine for automatically shutting down the oven before this occurs but, nevertheless, it is possible due to variations in the sizes and characteristics of the plastic sheets 54, for this to happen. This is particularly true when the machine is first being set up for a particular molding cycle, it being understood that the versatility of the machine of the present invention permits its use for forming many differently shaped articles of many different materials.

Accordingly, a fine mesh screen 112 is provided and carried, as appears in FIG. 2, adjacent the top of the lower oven section 94 so that if the plastic sheet 54 should fall it is caught on the screen 112 before dropping onto the heating coil 102.

Normally, at the end of the heating operation the sheet 54 is bowed to such an extent that it depends a short distance into the lower oven 94 and a novel feature of the present invention resides in the provision of means for pivoting the lower oven section 94 downwardly at the beginning of each cycle of rotation of the frames 38, 40 and 42 to provide the necessary clearance for the bowed sheet 54 to pass out of the heating station.

As appears clearly in FIG. 1, the lower oven section 94 is pivotally supported in the frame 40 on a shaft or axle 115 which is secured to the side wall 100 of the lower oven section and which is journalled at its ends in bearings 114 and 116. As shown, the bearing 114 is supported on a leg 114a extending up from the base 22.

As appears in FIG. 2, the lower oven section 94 carries at the side thereof opposite the shaft 115 a member 118 which is connected to the piston rod 119 of a pneumatic cylinder assembly 120. The cylinder assembly 120 is controllably actuated during operation of the machine to maintain the lower oven section 94 in the position shown by the full lines in FIG. 2 for heating of the plastic material on the frame 40 during the heating operation and at the termination of the heating operation to pivot the lower oven section 94 to the position shown by the dotted lines in FIG. 2 for increasing the distance between the frame 40 and lower oven section 94 to prevent the bowed plastic sheet from contacting the rear wall of the lower section 94, during movement out of the heating station.

There is also the possibility that the sheet 54 may sag sufficiently to contact the screen 112, so that it must be removed therefrom before it can be transferred to the forming station. The mere lowering of the oven 94 is not always adequate for this purpose. Consequently, a plenum chamber 122 which is connected to a source of air or other inert gas through a conduit 124 is mounted beneath the oven and is connected thereto by a plurality of apertures 126 formed in the bottom wall 98. Air pressure may thus be applied to the bottom of the plastic sheet to force it up out of engagement with the screen 112. Moreover, the air blowing against the bottom surface of the plastic material cools the plastic material to cause it to partially set in the elevated position.

After the plastic sheet has been heated in the oven station 12, the piston assembly 120 is automatically actuated to pivot the lower oven section 94 downwardly, and the frame 40 is then rotated to the next station, the molding station 14.

The molding station

As appears in FIG. 1, the molding station 14 includes an upper movable platen 128 and a lower movable platen 130, either or both of which may carry a die (not shown). The platens 128 and 130 may each be moved simultaneously, or first one platen may be moved to the molding position and then the other platen may be so moved, or vice versa, as desired. The die platens 128 and 130 and motors (not shown) carried by the platens 128 and 130 for actuating movement of the platens are of conventional construction and form no part of the present invention.

The upper platen 128, illustrated in FIG. 1, is reciprocable from the non-molding position shown in FIG. 1 downwardly to a predetermined molding position on three vertical guide rods, 132, 134 and 136. Each guide rod 132, 134 and 136, is connected at its upper end to the frame section 34 inwardly of the uprights 30 and 32 and at its lower end to an arm 138, one of which is shown in FIG. 1, extending radially from the upright 30. It will be observed that the arm 138 acts not only as a support for the said guide rods, but also as a lower limit stop for the platen 128. It will be observed also that the lower end of the guide rod 136 is not connected to an arm 138 so as to permit movement of the frames, such as frame 42, carrying the sheet material to the molding station from the oven station 12 and from the molding station 14 to the loading and unloading station 10.

The bottom platen 130 is similarly supported for reciprocation on three guide rods, 140, 142 and 146. The rods 140, 142 and 146 are fixed to the frame base 22 at their lower ends and the guide rods 140 and 142 are fixed to a support arm 148, one of which is shown in FIG. 1, secured to the upright 30. The arms 148 not only support the guide rods 140 and 142, but also provide stops defining the uppermost point of travel of the lower platen 130.

With the above described molding assembly, the platens 128 and 130 may be moved simultaneously or alternately to the proper molding position for molding a formed article from the sheet of plastic material suspended from the particular frame 38, 40 or 42, which happens to be in the molding position during operation of the molding system.

Since proper alignment of each frame, for example, frame 42, at the molding station is required in order to assure that the sheet of plastic material carried by the frame 42 is accurately aligned with the molding dies, there is provided, in accordance with the present invention, means for accurately aligning the frames in the molding station. To this end, as best shown in FIGS. 1 and 3, a feature of the present invention resides in a toggle arrangement located at the forming station 42 for accurately indexing the carriage 37 so that the particular frame which is in the molding station is accurately aligned with the die platens 128 and 130.

This indexing or registering arrangement, as best appears in FIG. 3, comprises an indexing toggle bar 150 attached at the ends thereof to crank arms 152 and 154, respectively, which are attached to a shaft 156 journalled for rotation in suitable bearings 158 and 160 on the uprights 30 and 32. An extension on the crank arm 154 is connected by a yoke 162 to the piston rod 164 of a pneumatic cylinder assembly 166 which is pivotally mounted on a bracket 168 secured to the upright 32.

Actuation of the cylinder 166 thus oscillates the bar 150 between the position shown in FIG. 3 in engagement with the frame 48 and a position (not shown) outwardly of the frame, where it is spaced a sufficient distance from the frame 42 to permit the frame 42 to be rotated from the molding position between the platens 128 and 130 upon termination of the molding operation. Thus, during rotation of the frame 42 from the molding position the rod 150 is maintained in this rearmost position to permit the next frame, frame 40, carrying a heated plastic sheet 54, to be rotated or moved into the molding station 14. The cylinder 166 is then actuated to rock the bar 150 into the position shown in FIG. 3 to accurately align the frame in the molding position.

The bar 150 carries two V-shaped locking devices, each formed by a pair of spaced guides 170 and 172, one pair of which is best shown in FIG. 4, provided with facing frusto-conical or beveled surfaces 174 and 176, respectively. The frames each carry a pair of locating arms 178, one of which appears in FIGS. 4 and 5, which extends outwardly from the frame member 44 at each end thereof. Each lug 178 is provided with a slot 180 for receiving the beveled portions of the guides 170 and 172.

Thus, if the frame 42 is offset, either to the right or left, when rotated into the molding station, when the toggle bar 150 is rocked to the aligning position shown in FIG. 3, one or the other of the bevelled faces 174 and 176 engages the lugs 178 and shifts the frame 42 into the predetermined molding position, thus providing a final alignment at the molding station.

Drive assembly

An important feature of the present invention resides in the new and improved drive assembly provided for sequential rotation of the frames 38, 40 and 42 through the three operating stations. The drive assembly of the present invention appears in FIGS. 1, 6, 7 and 8. As aforesaid, the drive shaft 78 has mounted thereon the rotatable dial plate 76 which has secured thereto the mounting bars 70 of the frames 38, 40 and 42. The frames 38, 40 and 42 thus radiate from the shaft 78 in 120 degree spaced relation to each other. As appears in FIG. 7, the shaft 78 is journalled at its lower end in a thrust bearing 182 mounted on the base plate 24 and is journalled, its upper end in a bearing 184, which is of a diameter substantially equal to the outside diameter of a reduced portion 189 of the shaft 78. The bearing 184 is bolted, as indicated at 186, to a stationary plate 188 which is supported by tripod of legs 190 connected, as by welding, to the base plate 24.

The dial plate 76 is secured to shaft 78 for rotation and rests on a thrust type support bearing 194, as by bolts 196. The central support post 36 carries an annular flange 198 spaced from the frames and is axially bored to receive the upper end 36a of the drive shaft 78 to axially align the shaft 78 and support 36 when assemblying the molding system.

To rotate the shaft a predetermined angular distance of 120 degrees and thereby move each of the frames 38, 40 and 42, from one operating station to the other, the shaft 78 is secured, adjacent the bottom thereof, to a drive plate 236 rotated by a pair of pneumatic cylinders 202 and 206. The drive plate 236 has three reinforced apertures 240 therein which are spaced 120 degrees apart. As appears in FIG. 8, the air cylinders 202 and 206 employed to drive the drive plate 236 are pivotally mounted. The cylinder 202 is pivotally attached at its end to a bracket 204, as at 210 and the air cylinder 206 is pivotally attached to a bracket 208, as indicated at 212. The brackets 204 and 208 are positioned in predetermined angular relation to the shaft 78 to permit free rotational movement of the shaft 78 and pivotable movement of the cylinders 202 and 206 during operation of the drive assembly. The brackets 204 and 208 are suitably secured, as by welding, to the triangular base plate 24. The piston rod 214 of the cylinder 202 and the piston rod 216 of the cylinder 206 carry, as clearly appears in FIGS. 7 and 8, clevices 218 and 220, respectively.

As appears in FIG. 9, the clevices 218 and 220 are each apertured to receive a bushing 222 housing a vertically reciprocable pin 224 which is connected, as by countersunk screw 227, to a spring loaded piston rod 225 of an air cylinder 226 threadedly secured at 226a to the bushing 222. The pin 224 is reciprocable in the bushing 222 against the force of a spring (not shown) in the air cylinder 226 and into the apertures 240 in the reinforcing bushings in the drive plate 236.

The bushing 222 depends through a suitable hole in a guide arm 228 freely pivotable about the shaft 78 and an annular flange 230 on the bushing 222 maintains the clevices 218 and 220, the cylinder 226 and the guide arm 228 in assembled relation. The guide arm 228, as appears in FIG. 7, is rotatably secured to the drive shaft 78 on a bearing 229 which is clamped to a split retaining ring comprising sections 230 and 232 by bolts 234 to the drive plate 236. The drive shaft 78 passes through coaxially aligned apertures formed by the split retaining ring and in the bushing 229 and the guide arm 228 and is thus permitted free rotational movement relative to the shaft 78 and drive plate 236.

Figure 8:
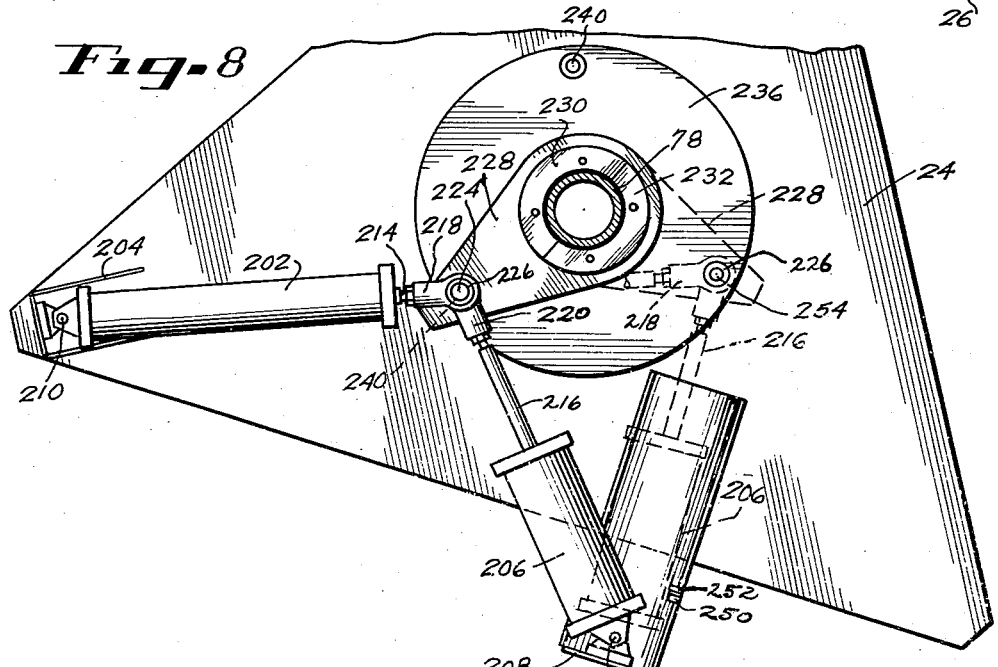
FIG. 8 is an enlarged, fragmentary view, in top elevation, illustrating the operation of the drive means of FIG. 1.

Thus, when the pin 224 is seated in one of the apertures 240 of the drive plate 236 and the cylinders 202 and 206 are actuated to move the shaft 78, the guide arm 228 is carried thereby from a first position shown in full lines in FIG. 8 to a second position shown by the dotted lines in FIG. 8. When the guide arm 228 is in the second position shown by the dotted lines in FIG. 8, the pin 224 is retracted from the aperture 240 and the cylinders 202 and 206 actuated to return in assembled relation with the guide arm 228 to the first position shown by the full lines in FIG. 8. The arm 228 thus serves as a guide for the return of the pin 224, cylinder 226, and cylinders 202 and 206 to the first position shown in FIG. 8.

In order to prevent damage to the drive assembly in the event the pin 224 is not accurately aligned with one of the apertures 240 at the time the air cylinder 226 is energized to depress the pin, a member 248, secured by bolts 244 and a spacer 242 to the guide arm 228, underlies the peripheral edge of the plate 236. Since the locating end of the pin 224 is somewhat spherical and since the member 248 supports the plate in proximity to the pin 224, the pin 224 cannot deform the drive assembly, but rotates the plate 236 the small amount necessary to align the aperture 240 with the pin 224.

The cylinders 202 and 206 are mounted such that in the fully extended position of both piston rods, the drive assembly is in the dotted line position of FIG. 8 and when the piston rod of cylinder 206 is fully extended and the piston rod of cylinder 202 is fully retracted, the drive assembly is in the solid line position of FIG. 8.

Air accumulator

Another novel feature of the present invention resides in the provision of an air accumulator within the drive shaft 78. As best appears in FIG. 7, the drive shaft 78 is hollow, being sealed off at the top and bottom, and provides an air accumulator chamber 246 which communicates through an aperture 271, formed in the dial plate 76 with a plurality of conduits leading to various air-operated assemblies of the present invention, such as cylinders of the clamping devices 52, which rotate with the shaft 78.

The chamber 246 is connected through a passage 268 formed in a sealing plug 270, of stepped diameter, as at 269 and 270a, to a rotatable union 266 (FIG. 7) which connects to a source of pressurized air such as the shop air system. In this manner, the supply of air to operate the various rotating assemblies, such as the cylinders of the clamping devices 52, is simplified since the need for a separate air accumulator is eliminated.

Pneumatic supply system

A preferred embodiment of a pneumatic supply system for operation of the molding system of FIG. 1 is schematically shown in FIG. 10.

The rotating air union 266 of FIG. 7 is connected by a supply line 276 to a source of pneumatic fluid (not shown) such as the shop air system, through a plurality of conduits 280 and 289 and connections 279 and 281. The conduit 289 may include a flow regulator 282, a check valve 284, an oiling port 285, a main regulator guage 286, and a fluid filter 288. A vacuum system (not shown) may be connected in the line 289 by conduit 287 to control flow of the pneumatic medium through the line 289.

Supply of pneumatic fluid to the molding station platens is as follows. The line 289 is also connected, as indicated at 283, to a line 290 having a regulator 291 therein for supplying the fluid to a normally open solenoid valve 292 controlling supply of the fluid through conduits 292 and 294 for reciprocation of the piston rod 295a of a cylinder 295. Piston rod 295a is connected to the upper platen 128 of the molding station and controls movement thereof to and from the molding position. Corresponding movement of the lower platen 130 is controlled through a connection 296 with the line 280. The connection 296 connects line 289 with a line 297 which supplies the pneumatic fluid to a solenoid valve 298 which operates cylinder 301, the piston rod 301a of which moves the lower platen 130 into and out of the molding position, depending upon the direction of supply of pneumatic fluid to the cylinder 301 through a pair of lines 299 and 300.

Supply of pneumatic fluid to the cylinders 202 and 206 is as follows. Line 289 is also connected through line 317 with a normally closed solenoid valve 321 and a normally open solenoid valve 322 which supply pneumatic fluid through conduits 319, 320, 323 and 324, respectively, to the cylinders 202 and 206, respectively, which are coupled to said lines through couplings 259, 258, 262 and 260.

The cylinder 120 controlling pivotal movement of the oven section 94 is connected to line 289 through connection 281, line 280, and line 297 in the following manner. The line 297 is connected to a normally closed solenoid valve 304 which supplies the pneumatic fluid through lines 305 and 306 to the cylinder 120. Line 297 is also connected to a normally closed solenoid operated valve 309 which controls the direction of the supply of pneumatic fluid through a pair of lines 310 and 311 to the cylinder 326 which controls retraction and protraction of the pin 224.

Pneumatic fluid is supplied to rotating parts of the molding assembly in the following manner. The aperture 271 appearing in FIG. 6 is in communication, as shown in FIG. 10, with a line 271a which is connected to the clamping devices 52 for controlling operation of a solenoid operated valve 400 of the cylinder 401 of the clamping devices. The line 276 is also connected to a line 278 which supplies the pneumatic fluid through a solenoid valve 329 which controls the direction of flow of the pneumatic fluid through a pair of lines 331 and 332 to the toggle bar rocking cylinder 166 at the molding station 14.

The switch 256 is synchronized to actuate the pivot cylinder 120 of the lower oven section 94. The lower oven section is in the normal lower or pivoted position shown by dotted lines in FIG. 2 upon initiation of the operation of the drive assembly to rotate the frames between the stations. Thus, as the frame 40 is being rotated out of the oven station to the molding station and the frame 38 is being rotated therto from the loading and unloading station, the lower oven section 94 is in this lowered position. However, when the switch 256 is contacted at the termination of the movement of the drive assembly to the second position as shown by the dotted lines in FIG. 8, the switch 256 actuates the solenoid of the valve 304 which pivots the lower oven section 94 upward to the position shown by the full lines in FIG. 8 for heating of the plastic sheet 54 on frame 38. The switch 256 holds the valve 304 open for a time sufficient to permit the plastic material 54 to be heated in the oven station 12. The valve 304 is thereafter deenergized automatically when the operator actuates the master control unit 80 to start the next cycle of operation of the drive assembly thereby permitting the lower oven section 94 to pivot downwardly to the position shown by dotted lines in FIG. 2 to permit the frames 40 and 38 to rotate out of and into the oven station.

In addition, the switch 256 when contacted by rod 254 actuates the solenoids of the valves 292 and 298 to move the platens 128 and 130 to the molding position for molding the sheet 54 on frame 40. The master control unit when actuated by the operator to start the next cycle of operation of the drive assembly causes the platens 128 and 130 to return to the position shown in FIG. 1. It will be appreciated that the frame 42 has moved to the loading and unloading station for removal of the formed articles therefrom by the operator of the molding assembly.

The switch 256, mounted on a bracket 260 on the leg 190, is actuated by a pin 254 connected to the piston of the cylinder 226 to operate the toggle bar arrangement of the molding station. At the initiation of the operation of the drive assembly, the toggle bar 150 is normally out of contact with the locating lugs 178 to permit rotation of the frame 42 to the loading and unloading station. When, however, the switch 256 is actuated, actuation of the valve 329 causes the bar 150 to be rocked forwardly into the molding position for contact with the lugs 178 of the frame then in the molding station. Since the pin 224 is necessarily free of the plate when the valve 329 is operated, the machine cannot be jammed by the toggle mechanism and the pin 224 simultaneously engages the rotatable table. Then, when the operator actuates the master control to initiate a new cycle of operation of the drive assembly, the master control unit actuates the valve 329 to return the toggle bar 150 to the rearward position, out of contact with the lugs 178, to thereby permit rotation of the frame from the molding station to the loading and unloading station.

Thus, the switch 256 controls operation not only of the cylinder 166 and drive cylinders 202 and 206, but also the oven section cylinder 120, and platen cylinders 295, and 301.

Referring to FIGS. 7 and 10, the dial plate 76 also carries three lugs 325, 326 and 327, lug 327 being shown in FIG. 7, which are spaced 120 degrees apart. Lugs 325 and 326, not shown, are similar to lug 327. These lugs are adapted to contact a switch 257 actuating the solenoid of the valve 329 which controls operation of the cylinder 226 for withdrawing the drive pin 224 from one of the apertures 240 in the plate 236. Thus, means are provided for automatically actuating the subassemblies of the molding assembly through each cycle of operation thereof.

*Operation*

In operation, the operator places the plastic sheet 54 in the clamp frame and then actuates two switches in the master control unit 80 to close the solenoid valve 309 controlling flow of the pneumatic fluid to the cylinder 226 which depresses the pin 227 into the aperture 240 of the drive plate 236 against the force of the spring (not shown) in the cylinder 226. The master control unit 80 also actuates the valve 321 controlling flow of the pneumatic fluid to the piston cylinder 202 which then begins to push the drive plate 236 in a counterclockwise direction from a first position shown in full lines in FIG. 8 to the second position shown by the dotted lines in FIG. 8.

Simultaneously, the master control unit 80 actuates the solenoid valve 322 controlling flow of the hydraulic fluid to the piston cylinder 206 and the cylinder 206 then cooperates with the cylinder 202 by pulling the drive plate 236 in the counterclockwise direction from the first position. As the cylinders 202 and 206, push and pull, respectively, the drive plate 236 is rotated in a counterclockwise direction. Subsequently, and at some intermediate or neutral position also determined by the angular relationship between the bracket 208 and the center post or shaft 78, the cylinder 206 contacts a switch 250 which is mounted on the bracket 208 and which controls operation of the valve actuating cylinder 206 to therby reverse the operation of the valve 322 and thereby the direction of flow of the pneumatic fluid in the cylinder 206 so that the cylinder 206 now pushes the drive plate 236 in cooperation with the cylinder 202 to the second position shown by dotted lines in FIG. 8. Thus, the cylinder 206 cooperates through a portion of the travel of the drive plate 236 to pull the drive plate with the cylinder 206 and through the remainder of the travel of the drive plate 236 to the second position to push the drive plate with the cylinder 202 to the second position shown by the dotted lines in FIG. 8.

In order to lift the drive pin 224 when the cylinders 202 and 206 reach the end of their respective strokes, one of the dial plate depending lugs, 325, 326 and 327, spaced 120 degrees apart, contact the switch 257 fixedly carried by the support 188. Actuation of the switch 257 interrupts the circuit to the solenoid of the valve 309 supplying the pneumatic fluid to cylinder 226 and thereby terminates flow thereto. The spring of the cylinder 226 then forces the pin 224 from the aperture 240 in the drive plate 236.

It will be appreciated that if cylinders 202 and 206 were to start their clockwise return of the guide arm 228 and pin 224 to the first position shown by the full lines in FIG. 8 before the pin 224 has been fully retracted from the aperture 240 in the drive plate 236, damage would be caused to the pin 224 and/or possibly to other components of the drive assembly. To prevent such return of the drive arm 228 until after the pin 224 has been fully retracted from the apertures 240, the switch 256 also controls operation of the solenoid valves 321 and 322 which control flow of the pneumatic fluid to cylinders 202 and 206. When contacted by the rod 254, the switch 256 reverses the direction of flow in the cylinders 202 and 206 so that the cylinder 206 now pulls the guide arm 228, the cylinder 226, and the retracted pin 224 in a clockwise direction in cooperation with the cylinder 206 which pushes the guide arm 228 in the clockwise direction to return the guide arm, the cylinder 226, and pin 224 to the position shown by full lines in FIG. 8.

As the cylinder 206 is pivoted to the left, as shown in FIG. 8, on bracket 208, the cylinder 206 moves from contact with and opens the contact 252 which actuates the valve 322 controlling operation of the cylinder 206 thereby to reverse the direction of flow of the pneumatic fluid to this cylinder 206. Thereafter, the cylinder 206 cooperates with the cylinder 202 so that cylinder 202 pulls and cylinder 206 pushes the drive arm 228 to the first position shown in full lines of FIG. 8 to thereby complete the cycle of operation of the drive assembly. It will be observed that in the counterclockwise movement of the shaft 78 during the first half of the cycle of operation of the drive assembly, the shaft 78 has been rotated 120 degrees and each of the frames 38, 40 and 42 have likewise been rotated a similar distance from one station to the next station.

It will be appreciated, of course, that movement of the drive plate 236 and actuation of the cylinders 202, 206 and 226 are synchronized with the loading and unloading station, oven station, and molding station, and the time that the table remains stopped at the operating positions is controlled by the operator. Since the time that the plastic sheets 54 remain in the oven should not exceed some predetermined time, a suitable alarm, not shown, should be provided to warn the operator when such time limit is being approached.

*Clamping device*

In machines of this type, difficulty may be encountered in providing clamps which firmly hold the sheets 54 as the size and hardness thereof change during both heating and forming. The clamps 52 have been designed to exert a uniform and constant pressure on the sheet of plastic material 54 throughout a complete cycle of operation. It will be appreciated that, depending upon the physical and chemical characteristics of the plastic sheets 54 and the conditions in both the oven section and in the molding section, the plastic sheet may tend to elongate, become pliable, or have its cross-section reduced or increased in any one of these stations. Thus, the clamping means employed to hold the sheet to the frames becomes important to prevent the sheet from slipping therefrom and being damaged.

In accordance with the present invention, a new and improved clamping device 52 has been devised which applies a uniform and constant pressure on the sheet 54, regardless of the cross-sectional thickness of the sheet or change in such thickness. Referring to FIG. 11, there is shown a preferred embodiment of the clamping device 52 which includes a cylinder 401 having a reciprocable shaft 402 which is pivoted, as at 403, to a pivotable L-shaped upper arm 404 having one leg 405 thereof adapted to clamp against the upper surface of the sheet 54. The leg 405 cooperates with a complementary leg 406 of a stationary L-shaped member 406a which contacts the bottom surface of the sheet 54 to clamp the marginal edge of the sheet 54 therebetween. An L-shaped member 406a is secured, as by a bolt 407, to a leg 408 of each of the frames 38, 40 and 42. A plurality of the clamp devices 54 are positioned on each of the frames 38, 40 and 42 for rigidly suspending the sheet 54 of plastic material therebetween.

There is mounted on the L-shaped leg 408 a clevice bracket 409 secured thereto as by bolts 409a. The clevice is apertured to receive a pin 410 secured to a solenoid valve 400 of the piston cylinder 401 to fixedly secure the piston cylinder 401 during operation of the shaft 402.

To assure uniform movement of the pivot member 404, a spring 410 is provided which bears against the leg 405 and which is secured between the leg 408 and bracket clevice 409 by the bolts 409a. Thus, the possibility of the leg 405 damaging the plastic material 54, when it comes in contact therewith, is minimized.

The piston shaft 402, when in the retracted position, holds the leg 405 in an upwardly pivoted position out of contact with the sheet 54 to permit the operator to insert a sheet onto the leg 406. When the cylinder 401 is actuated, the piston shaft 402 is protracted and the spring 410 urges the leg 405 downward onto the sheet 54 which is on the legs 406 with a uniform pressure being applied thereto. With the spring applying a force bearing on the sheet 54, the cross-sectional thickness of which, during cycling of the sheet through the oven and molding stations, may vary, is firmly suspended between the clamp devices 52. The clamp devices will continuously apply the desired holding force on the sheet, regardless of its cross-sectional dimension.

The pneumatic fluid is supplied to the cylinders 401 through the conduits 271a and 275 (FIG. 10) which are carried by the shaft 78. The plate 188, shown in FIG. 6 as integral with the bearing 184, carries an arm 430 which has a contact 431 which is adapted to open the cylinders 401 by engaging a switch (not shown) carried by each of the frames 38, 40 and 42 when the frame is in the loading and unloading position. Thus, as the frame reaches the unloading position, the contact 431 actuates the cylinders to retract the piston 402 and pivot the leg 405 from contact with the sheet 54 to permit removal thereof by the operator. The operator then places another sheet 54 on the bottom legs 406 and actuates the master control unit 80 which actuates the valves 400 to clamp the leg 405 against sheet 54 and thereby firmly suspend the sheet between the legs 405 and 406 on the frame. The frame then moves from the loading and unloading station to the oven station in accordance with the procedure outlined above. The arm 430 carries a valve housing 315 which, when the switch carried by the frame is actuated by the contact 431, pushes upward a valve piston 316 to permit escape of the air in the cylinders 401 thereby permitting the piston 402 to be retracted to permit removal of the sheet 54 from the frame.

Thus, with the present invention there is provided new and improved means for molding articles from plastic and like material.

While the present invention has been described in connection with a particular embodiment thereof, it will be understood that those skilled in the art may make many changes and modifications without departing from the true spirit and scope of the invention and, therefore, it is intended by the appended claims to cover all such changes and modifications which fall within the true spirit and scope of the invention.

I claim:
1. In a system including a rotatable frame means, a drive assembly for successively rotating said frame means from one to another succeeding stations comprising means movable between a first position and a second position for engaging said frame means to thereby permit movement of said frame means from one of said stations to another of said stations, means for automatically disengaging said movable means from said frame means when said movable means is in said second position, first force applying means for moving said movable means from said first position to said second position and for returning said movable means to said first position from said second position, second force applying means operatively responsive to movement of said first force applying means for cooperating with said first force applying means to move said movable means from said first position to said second position by pulling said movale means to move it through a portion of its path of travel to said second position and thereafter by pushing said movable means to move it through the remainder of its path of travel to said second position, and means operatively responsive to said movable means for actuating said means for disengaging said movable means and for reversing operation of said first and second force applying means to return the disengaged movable means to said first position.

2. The drive assembly of claim 1 wherein the first and second force applying means each comprises a pressure operated cylinder having a reciprocable pressure actutable shaft in engagement with said movable means for moving said movable means between said first and second positions.

3. The drive assembly of claim 2 wherein said movable means includes a reciprocable member movable between said positions by the shafts of said pressure operated cylinders and actuatable to engage said frame means when in said first position for moving said frame means from one of said stations to another of said stations, said member being actuatable, when in said second position, to be automatically disengaged from said frame means by said disengaging means for return by said shafts to said first position.

4. The drive assembly of claim 3 wherein said movable means includes a spring loaded cylinder device movable between said positions and carried by the shaft of at least one of said pressure operated cylinders, said reciprocable member being normally biased by the spring of said spring loaded cylinder device from contact with said frame means, said spring loaded cylinder device being actuatable to move said member into engagement with said frame means, when said movable means is in said first position, said spring loaded cylinder device being actuatable by said disengaging means to disengage said member from said frame means to thereby permit return of said member to said first position.

5. The drive assembly of claim 4 wherein said disengaging means includes a protruding means carried by said frame means for contacting a switch located in a predetermined relation to said movable means when said movable means are in said second position for momentarily interrupting operation of said spring loaded cylinder device to thereby permit the spring of said spring loaded cylinder device to move said reciprocable member from engagement with said frame means only after movement of said frame means from one of said stations to the other of said stations has been completed, a switch device actuable by said movable means only after said reciprocable member has been disengaged from said frame means for actuating operation of said means for reversing operation of said first and second force applying means, said reciprocable member being connected for reciprocation to a piston rod of said spring loaded cylinder device, and a rod connected for reciprocation to said piston rod, said rod being actuatable to contact said switch device only after said reciprocable member has been disengaged from said frame means and said frame means has completed its movement from one to another of said stations.

6. The drive assembly of claim 2 wherein each of said pressure operated cylinders is pivoted for movement.

7. The drive assembly of claim 6 including a stationary switch actuated device adapted to control operation of a valve of said pressure operated cylinder of said second force applying means, the switch of said device being located relative to said last mentioned cylinder so that said last mentioned cylinder contacts said switch as it is pivoted during movement of said movable means from said first position to said second position, said switch, when so contacted, being adapted to reverse operation of said valve whereby the operation of said last mentioned cylinder is reversed for pushing said movable means to said second position.

8. The drive assembly of claim 7 wherein said reversing means includes a contact switch device adapted to be closed by the cylinder of said second force applying means when said movable means are being moved from said first position to said second position and to be opened by said last mentioned cylinder as said movable means are being moved from said second position to said first position for reversing the operation of said last mentioned cylinder, said contact switch being located relative to said last mentioned cylinder so that it closes and opens only when said movable means is at a predetermined position between said first and second positions.

9. The drive assembly of claim 3 wherein said reciprocable member comprises a reciprocable pin and said drive assembly includes a rotatable drive shaft carrying said frame means for rotation thereof, a rotatable drive plate carried by said drive shaft, at least one aperture in said drive plate engageable by said pin for movement of said drive plate and said drive shaft to thereby move said frame means from one of said stations to another of said stations.

10. The drive assembly of claim 9 including a guide arm rotatable about the axis of said drive shaft and connected to said pressure operated cylinders and to a bushing housing said reciprocable member for guiding movement of said member and pressure operated cylinders between said first and second positions.

11. The system of claim 1 wherein one of said stations is a heating station and includes upper and lower oven sections spaced relative to each other to permit said frame means to traverse said heating station, said lower oven section being pivotably mounted to a support of said heating station, and means for automatically pivoting said lower oven section to said spaced position relative to the upper oven section upon completion of movement of said movable means to said second position.

12. The system of claim 11 wherein said oven sections comprise an upper and a lower oven section, and including fluid means for directing a fluid under pressure against molding material carried by said frame means for removing said molding material from contact with said lower oven section.

13. The system of claim 11 wherein said heating station includes an upper and lower oven section, said sections being spaced relative to each other to permit said frame means to traverse said heating station, heating means in said oven sections and a screen device in said lower oven section for preventing contact of heated molded material spanning an opening in said frame means with heating means in said lower oven section.

14. The system of claim 11 wherein said oven sections comprise an upper and lower oven section, and including means for applying pressurized fluid to heated molding material on said frame means to remove said material from contact with said lower oven section.

15. The system of claim 1 including a means for aligning said frame means comprising a bar which is movable into contact with said frame means to thereby align the frame means in a predetermined position in a station, said bar being actuatable to move from contact with said frame means when said frame means is being moved by said drive assembly, and means for actuating movement of said bar into and out of contact with said frame means, said bar carrying a pair of spaced members, each member having a pair of facing beveled surfaces, and said frame means carrying a grooved lug, the groove of said lug being adapted to contact at least one of said beveled surfaces and thereby shift the frame means to said predetermined molding position.

16. In a machine including a rotatable frame means, a drive assembly adapted to rotate the frame means through a predetermined angle about the axis of rotation comprising; in combination, a movable member adapted to be connected with and disconnected from said frame means, means for connecting and disconnecting said frame means and said movable member, a pair of cylinder devices for moving said movable member and said frame means when connected together from a first position to a second position, said cylinder devices being pivotally mounted about respective axes lying in spaced apart relationship and at least one of said devices being in its extreme position when said frame is in said first and second positions, said cylinder devices being adapted to return said movable member to said first position when disconnected from said frame means, and means for controlling operation of said cylinder devices.

17. A machine according to claim 16 including a shaft device affixed to said frame means, a movable plate concentric with said shaft device and carried for rotation thereby, apertures in said plate spaced apart 120 degrees and positioned the same distance radially from the axis of said plate, a movable and reciprocable pin carried by said cylinder devices for selective and alternate engagement in said apertures with said plate to rotate said plate and said shaft device, and means for retracting said pin from engagement in said apertures when said movable member is in said second position.

References Cited by the Examiner

UNITED STATES PATENTS

| | | | |
|---|---|---|---|
| 824,710 | 7/06 | Desgrandchamps | 18—20 XR |
| 2,193,395 | 3/40 | Dewey | 18—20 |
| 2,420,709 | 5/47 | Kopplin | 18—43 |
| 2,471,739 | 5/49 | Gregg | 18—4 |
| 2,499,399 | 3/50 | Lyon | 18—4 |
| 2,547,275 | 4/51 | Lyon | 18—19 |
| 2,560,475 | 7/51 | Rehnberg | 74—116 |
| 2,638,334 | 5/53 | Jones | 263—40 |
| 2,685,708 | 8/54 | Pollock | 18—20 XR |
| 2,687,118 | 8/54 | Bennett | 121—63 |
| 2,772,084 | 11/56 | Pearsall | 263—40 |
| 2,832,235 | 4/58 | Denman. | |
| 2,837,062 | 6/58 | Thorpe | 121—63 |
| 2,862,232 | 12/58 | Rekettye | 18—4 |
| 2,877,624 | 3/59 | Zoller | 60—51 |
| 2,887,846 | 5/59 | Habenicht | 60—51 |
| 2,926,387 | 3/60 | Lombardo et al. | 18—43 |
| 3,010,176 | 11/61 | Blackburn et al. | 18—20 XR |

MICHAEL V. BRINDISI, *Primary Examiner.*

ROBERT F. WHITE, NEDWIN BERGER, *Examiners.*